United States Patent

Hosny

(12) United States Patent
(10) Patent No.: US 6,709,235 B2
(45) Date of Patent: Mar. 23, 2004

(54) TURBINE HOUSING FOR HIGH EXHAUST TEMPERATURE

(75) Inventor: Diaa M. Hosny, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 108 days.

(21) Appl. No.: 09/952,766

(22) Filed: Sep. 14, 2001

(65) Prior Publication Data

US 2003/0053910 A1 Mar. 20, 2003

(51) Int. Cl.$^7$ .............................................. F04D 29/44
(52) U.S. Cl. ......................................... 415/205; 415/206
(58) Field of Search ................................ 415/203, 204, 415/205, 206, 213.1; 417/407; 60/605.1

(56) References Cited

U.S. PATENT DOCUMENTS

| | | | |
|---|---|---|---|
| 3,664,761 A | * 5/1972 | Zastrow | 415/205 |
| 3,734,650 A | * 5/1973 | Reisacher et al. | 417/407 |
| 4,351,154 A | * 9/1982 | Richter | 60/605 |
| 5,025,629 A | * 6/1991 | Woollenweber | 60/600 |
| 5,094,587 A | 3/1992 | Woollenweber | |
| 5,406,795 A | * 4/1995 | Raub et al. | 60/605.1 |
| 5,673,559 A | 10/1997 | Benson | |

FOREIGN PATENT DOCUMENTS

| | | |
|---|---|---|
| GB | 935231 | 8/1963 |
| JP | 62228627 | 7/1987 |
| JP | 08303201 | 11/1996 |

OTHER PUBLICATIONS

SE Paper 981035.

* cited by examiner

Primary Examiner—Ninh H. Nguyen
(74) Attorney, Agent, or Firm—Ephraim Starr; Brian Pangrle

(57) ABSTRACT

A turbocharger turbine housing of this invention comprises a generally circular-shaped body having an exhaust gas inlet flange at a radial housing end and an exhaust gas outlet at an axial end. The inlet flange is configured having openings to two volutes that are separated by a wall divider, thereby forming an X-shaped pattern. The inlet flange is additionally configured having rounded and uniform thickness walls. The volutes are configured having a nonuniform shape and size, and the wall divider is configured having a diminishing area between the volutes, moving through the housing away from the inlet flange. The volutes are configured having a non-uniform shape and size with respect to one another as well moving through the turbine housing. Configured in this manner, turbocharger turbine housings of this invention serve to minimize thermal stress effects caused from transient thermal loading, thereby minimizing and/or eliminating thermal stress relating damage such as cracking.

14 Claims, 12 Drawing Sheets

TURBINE HOUSING FOR HIGH EXHAUST TEMPERATURE

FIELD OF THE INVENTION

This invention relates generally to the field of turbochargers and, more particularly, to a turbocharger turbine housing that is specifically designed to reduce thermal stress related cracking due to increased operating exhaust temperatures.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of the shaft and housed in a compressor housing. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber. The turbine housing and compressor housing are each attached to a common turbocharger center housing that rotatably houses the common shaft extending between the turbine and compressor.

Conventionally, the turbine housing is connected to an engine exhaust manifold via an exhaust inlet flange for receiving the exhaust gas exiting the engine combustion chamber. Exhaust gas directed into the turbine housing enters via the inlet exhaust flange and is directed into one or more passages or volutes in the turbine housing. A volute defines a generally spiral- or circular-shaped passageway through the turbine housing that is designed to direct the exhaust gas radially inward towards the centrally-mounted turbine to spin the turbine.

Turbine housings known in the art can comprise a bifurcated volute arrangement, whereby the volute running through the housing is bifurcated by a partial divider wall. Additionally, turbine housings known in the art comprise a squared-off and nonuniform thickness wall that defines the exhaust inlet flange. It is known that turbochargers comprising such conventional turbine housing designs are prone to develop thermal stresses and thermal stress related cracking. It is believed that such turbine housing thermal stress related cracking is caused, at least in part if not in whole, by the reaction of such conventional design features to the transient thermal loading placed on the turbocharger during normal operation. Such turbine housing thermal cracking results in gas leakage/escape from the turbocharger, which not only reduces turbocharger efficiency but can cause engine problems and engine compartment/ancillary engine component problems associated with the added heat provided to the surrounding environment. The issue of turbine housing cracking is one that is of increasing significance due to current engine operating trends of higher exhaust temperatures driven by retarded fuel timing to reduce NOX emissions and by increased engine ratings.

It is, therefore, desired that a turbocharger be constructed comprising a turbine housing that is designed to minimize and/or eliminate the potential for thermal stress related cracking. It is desired that such turbine housing be retrofittable with existing turbocharger parts to facilitate retrofit application. It is further desired that such turbine housing be configured in such a manner so as to achieve this desired result without adversely affecting other turbocharger performance properties, e.g., turbocharger efficiency.

SUMMARY OF THE INVENTION

Turbocharger turbine housings, constructed according to principles of this invention, comprise a generally circular-shaped body having an exhaust gas inlet flange at a radial housing end and an exhaust gas outlet at an axial end. Unlike conventional turbocharger turbine housings, the inlet flange is configured having two openings (thereby forming two volutes through the housing) that are separated by a wall divider, forming an X-shaped pattern. The inlet flange and volutes are additionally configured having rounded and uniform thickness walls with the volute wall adjacent the V-band flange and V-band clamp for attachment to the center housing substantially parallel to the V-band flange and spaced therefrom to preclude a notched configuration.

The volutes are configured having a nonuniform/nonconstant shape and size, and the wall divider is configured having a diminishing area between the volutes, moving through the housing in a direction away from the inlet flange. Moving through the turbine housing away from the exhaust inlet flange, the volutes undergo size and shape changes with respect to one another. Specifically, a first volute undergoes a change in a radial dimension while a second volute undergoes a change in an axial dimension. Moving still further through the housing, the changes in volute shape relative to one another decrease and the wall divider diminishes so that the two volutes are joined together by a common passage, thereby forming a single bifurcated volute.

Configured in this manner, turbocharger turbine housings of this invention operate to minimize thermal stress effects caused from transient thermal loading, thereby minimizing and/or eliminating thermal stress relating cracking to extend turbocharger service life.

BRIEF DESCRIPTION OF THE DRAWINGS

These and other features and advantages of the present invention will become appreciated as the same becomes better understood with reference to the specification, claims and drawings wherein:

DETAILED DESCRIPTION OF THE INVENTION

Turbocharger turbine housings, constructed according to principles of this invention, include an exhaust inlet flange and exhaust gas volutes that are specially designed to minimize and/or eliminate the development of thermal stresses caused from transient thermal loading during turbocharger operation.

Figure 1:
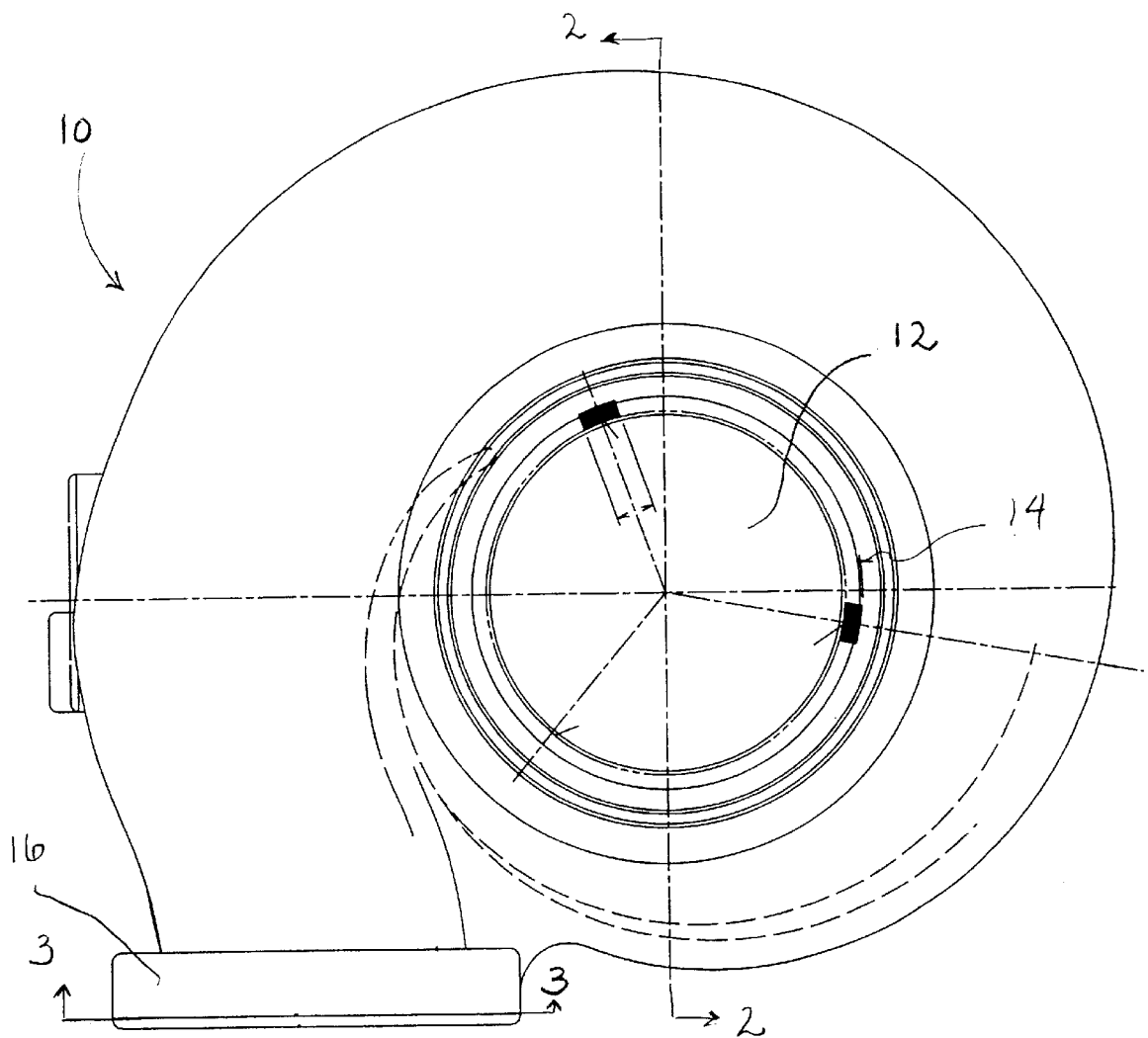
FIG. 1 is an elevational side view of a turbine housing constructed according to principles of this invention.

FIG. 1 illustrates a turbocharger turbine housing 10 of this invention having a generally spiral-shaped or circular configuration with a centrally positioned opening 12 defining an exhaust outlet 14. An exhaust inlet flange 16, for receiving exhaust gas from an engine, is positioned at a radial end of the turbine housing. Generally speaking, the exhaust gas received at the inlet flange 16 is directed inside the turbine housing and passed along through the circular housing towards the inlet nozzle for spinning a turbine (not shown).

Figure 2:
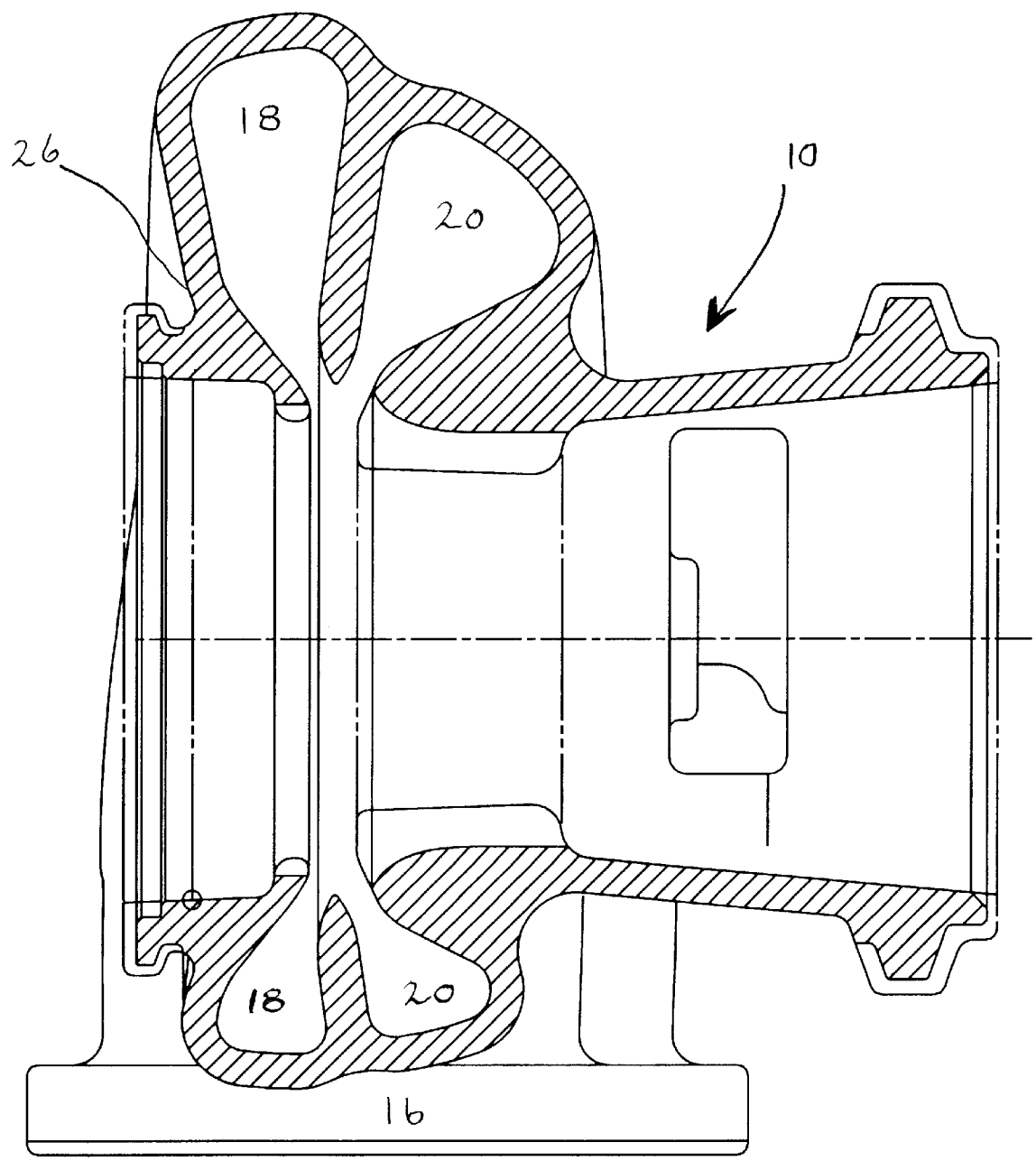
FIG. 2 is a cross-sectional view of the turbine housing of FIG. 1, taken along section 2—2 of FIG. 1.

FIG. 2 illustrates a view of the turbine housing 10 along section 2—2 of FIG. 1. This view illustrates twin or dual volutes 18 and 20 disposed within the housing and in gas flow communication with the inlet flange 16. As shown in FIG. 2, the volutes 18 and 20 do not have a constant cross-sectional area or size moving through the housing. Rather, the volutes 18 and 20 are configured having a reduced cross-sectional area or size moving through the housing away from the inlet flange 16. Additionally, volutes 18 and 20 are each shaped differently at any one location along the turbine housing. For example, volute 18 is shaped having a generally greater radial dimension when compared to volute 20, and volute 20 is shaped having a generally greater axial dimension when compared to volute 18.

Figure 3:
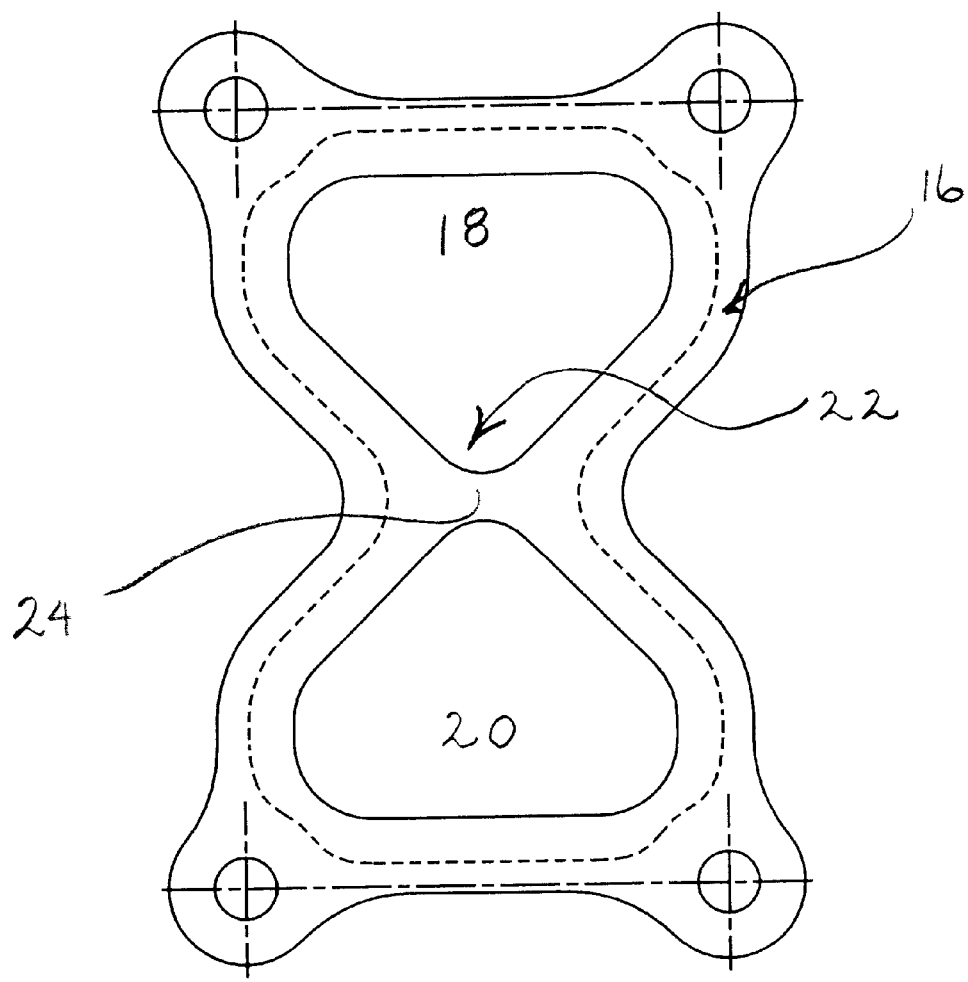
FIG. 3 is a front view of an exhaust inlet flange from the turbine housing of FIGS. 1 and 2, taken along section 3—3 of FIG. 1.

FIG. 3 illustrates a view of the exhaust inlet flange 16 along section 3—3 of FIG. 1. Unlike conventional turbocharger turbine housings, turbine housings of this invention comprise exhaust inlet flanges having a cross or X-shaped internal design 22 that is provided by a common volute wall divider 24, separating volutes 18 and 20. As better illustrated in the remaining figures, the wall divider 24 vanishes moving inwardly into the turbine housing from the inlet flange. Together, the X-shaped internal design with vanishing wall divider are important features of this invention as they function to eliminate a major driver for flange loading due to transient thermal cycling, thereby serving to minimize or eliminate thermal stress related cracking.

In addition to these design features, the inlet flange 16 includes unique curved walls that result in better distribution of mechanical loads due to thermal expansion, also serving to reduce or eliminate thermal stress related cracking. The turbine housing walls along the inlet flange and volutes are also trimmed to have a more uniform thickness to provide better thermal balance and to increase joint flexibility. As will be discussed below, the volutes are articulated to provide controlled thermal expansion characteristics.

Figure 4A:
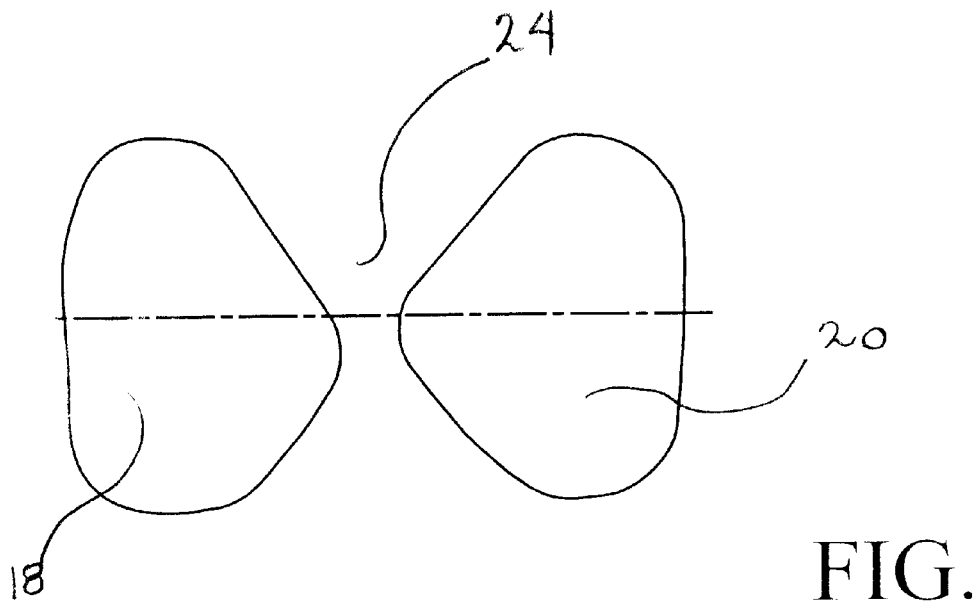
FIGS. 4a to 4e are cross-sectional views of exhaust passages/volutes through the turbine housing of FIGS. 1 and 2, taken at different locations through the turbine housing moving away from the exhaust inlet flange.
Figure 4B:
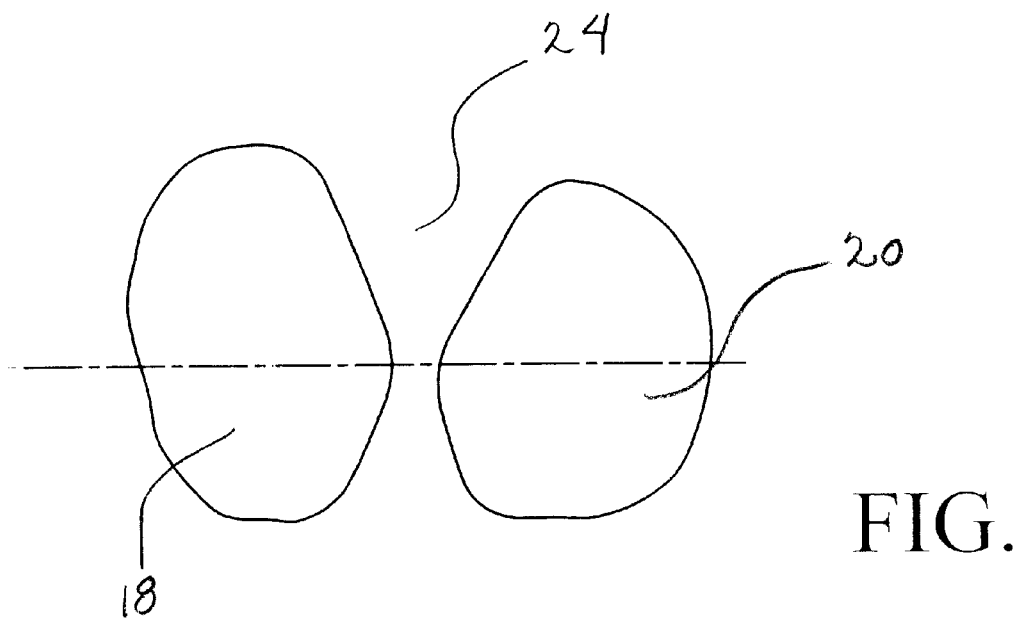

FIGS. 4a to 4e illustrate how the shape of volutes 18 and 20, and the wall divider 24, changes at different locations through the turbine housing moving away from the inlet flange 16 towards a position in the housing near the cross-sectional view illustrated at the top of FIG. 2 (i.e., at a position within the turbine housing before the volutes open into one another forming a single bifurcated volute). FIG. 4a illustrates the volutes 18 and 20 as having a generally similar configuration, and the wall divider 24 providing the X-shape design desired at the exhaust inlet flange. FIG. 4b is taken a small distance away from FIG. 4a, and illustrates volute 18 as taking on a slightly greater vertical or radial dimension, when compared to volute 20. Additionally, at this location, the wall divider 24 has begun to diminish in size.

Figure 4C:
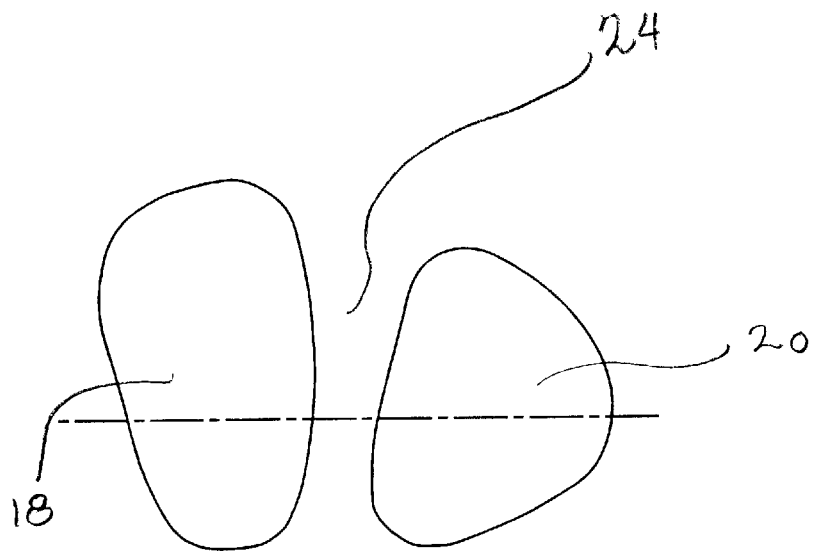
Figure 4D:
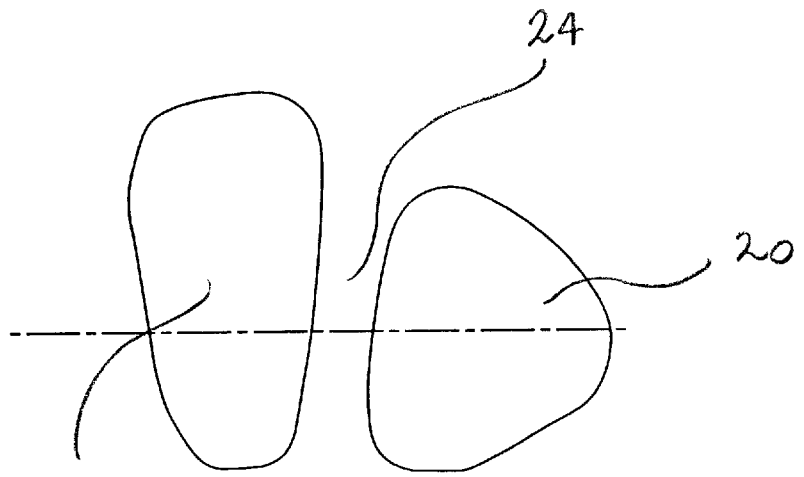
Figure 4E:
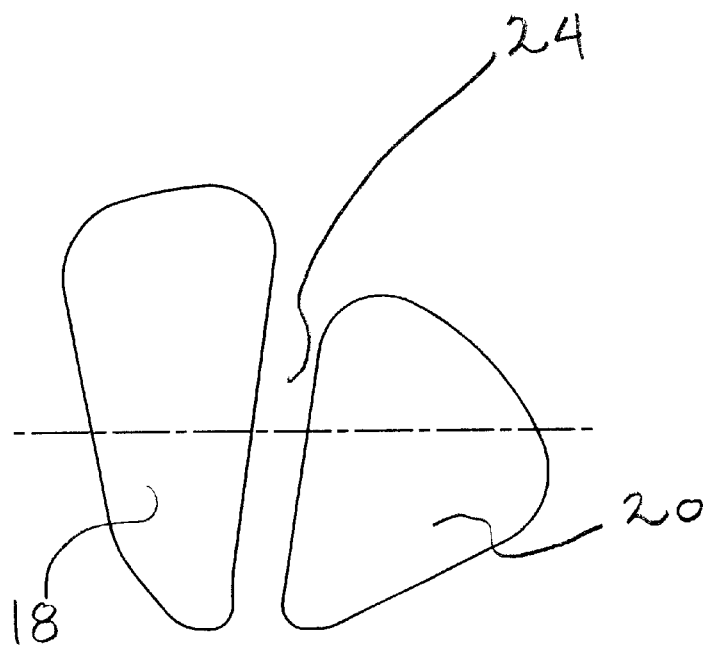

FIG. 4c is taken at a point a small distance away from FIG. 4b, and illustrates volute 18 as taking on a definitely greater vertical or radial dimension when compared to volute 20, and illustrates that the wall divider is less substantial and is beginning to take on a more consistent thickness between the volutes. FIG. 4d is taken at a point a small distance away from FIG. 4c, and illustrates that volute 18 is still expanding in a vertical dimension when compared to volute 20, and illustrates that the wall divider is starting to have an almost constant thickness between the volutes. FIG. 4e is taken at a point a small distance away from FIG. 4d, and illustrates volute 18 as having a pronouncedly vertically-aligned configuration when compared to the horizontally bulging configuration of volute 20. Additionally, the wall divider 24 at this point in the housing has a substantially constant wall thickness between the volutes that has diminished in size from that illustrated in FIG. 4d.

Figure 5A:
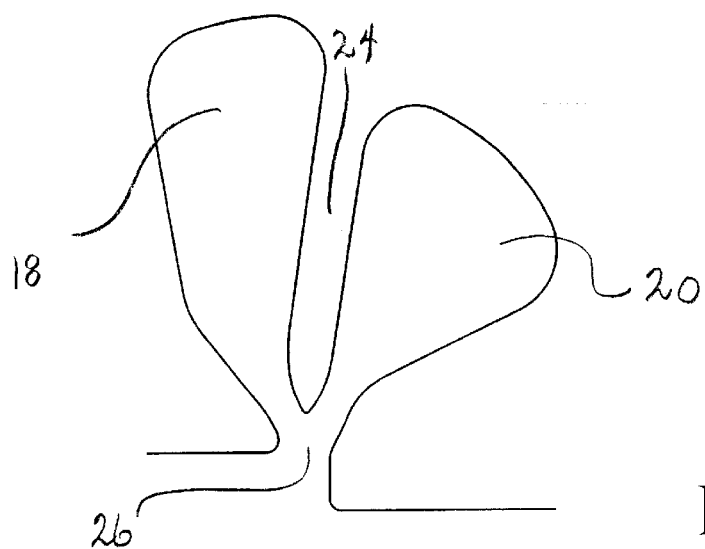
FIGS. 5a to 5r are cross-sectional views of the exhaust passages/volutes through the turbine housing of FIGS. 1 and 2, taken at different locations through the turbine housing continuing from FIGS. 4a to 4e.
Figure 5B:
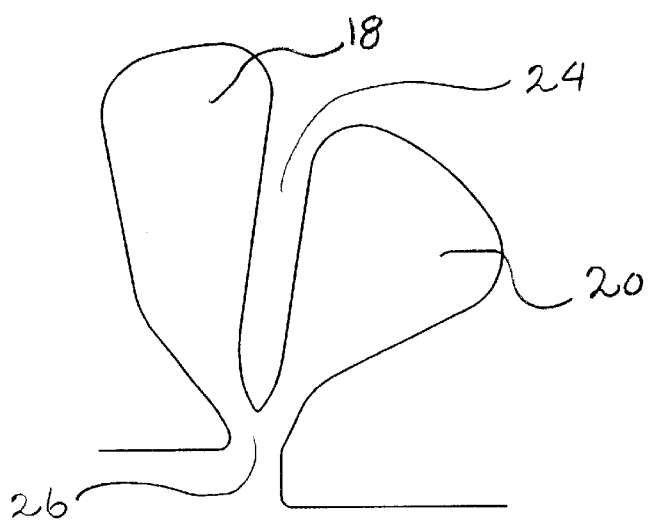
Figure 5C:
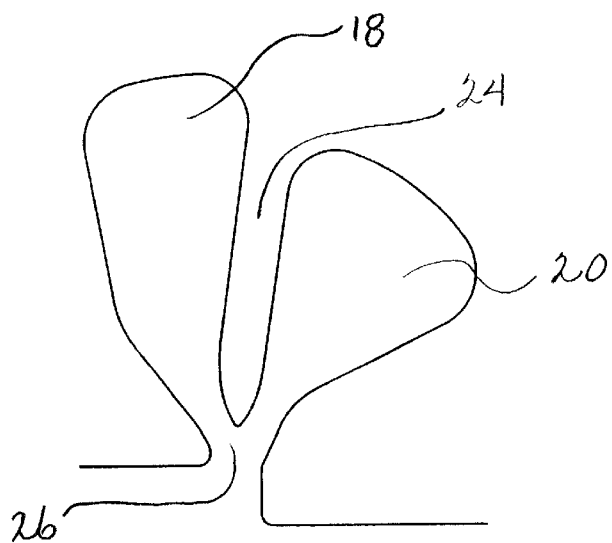
Figure 5D:
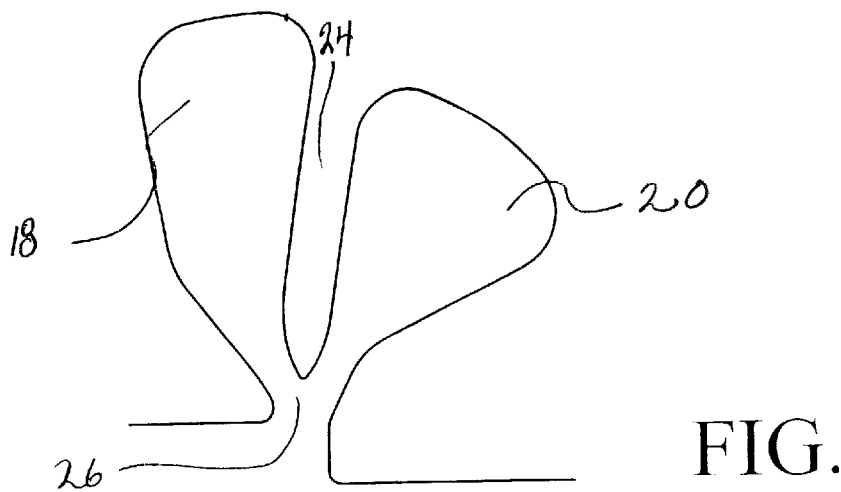
Figure 5E:
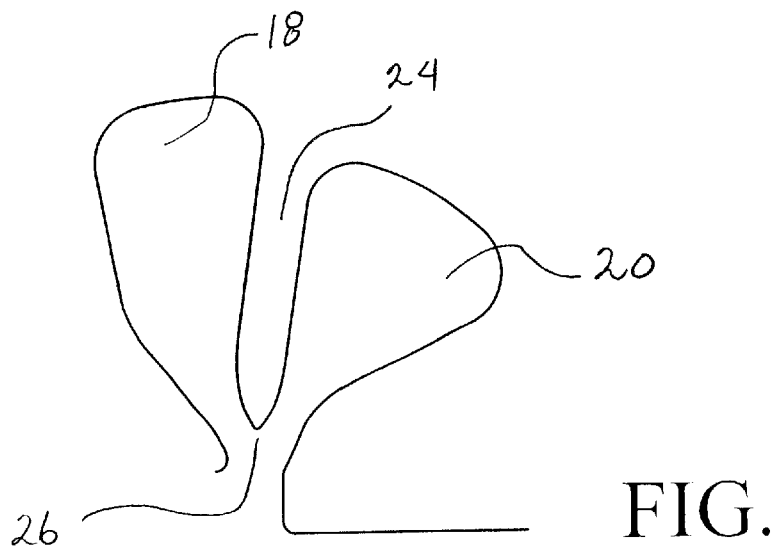
Figure 5F:
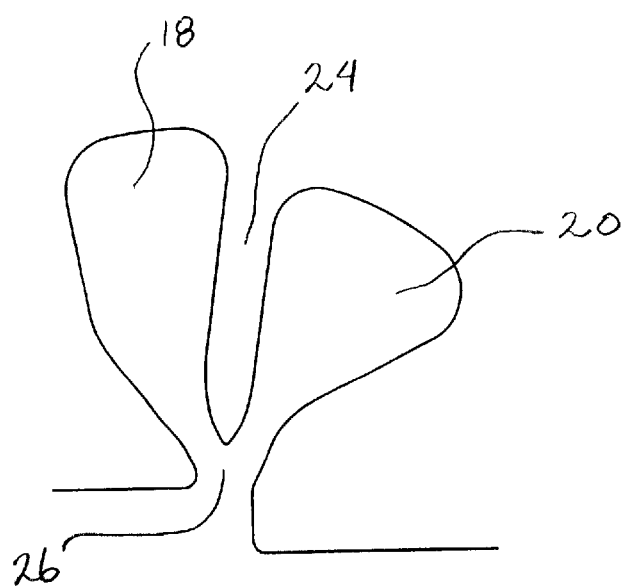
Figure 5G:
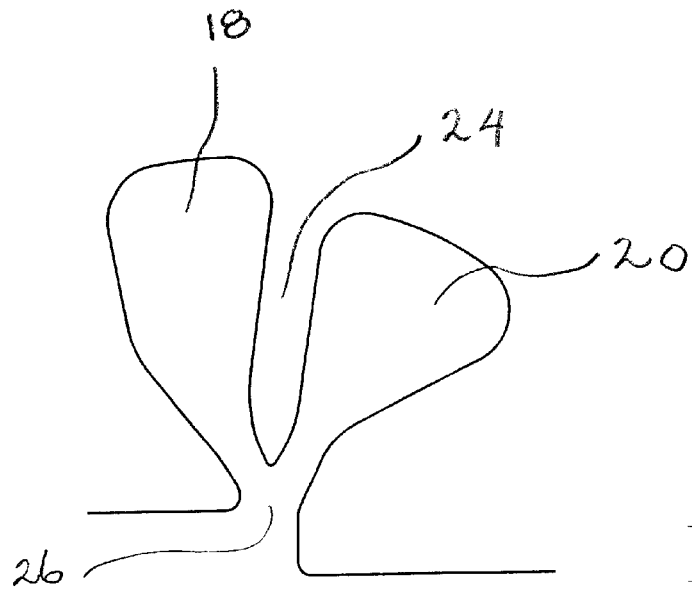
Figure 5H:
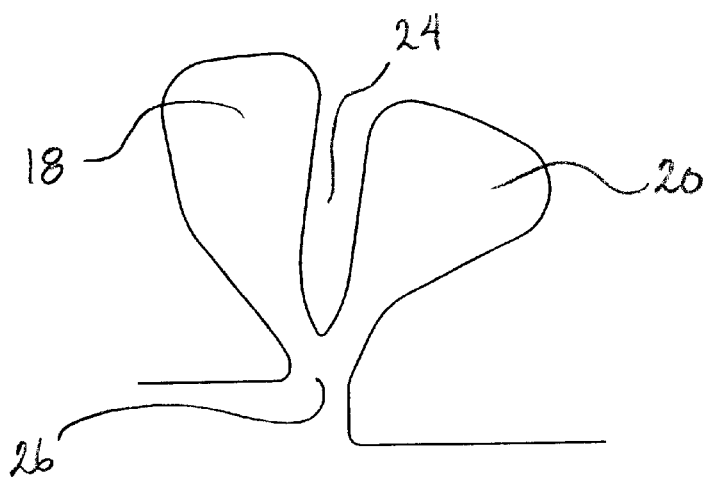
Figure 5I:
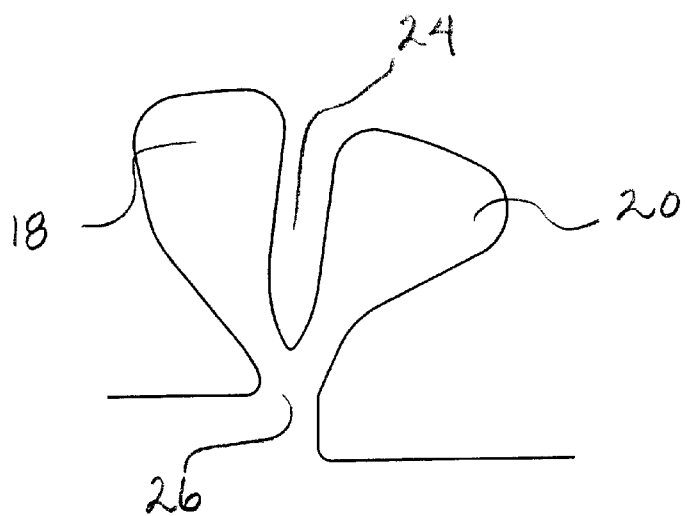
Figure 5J:
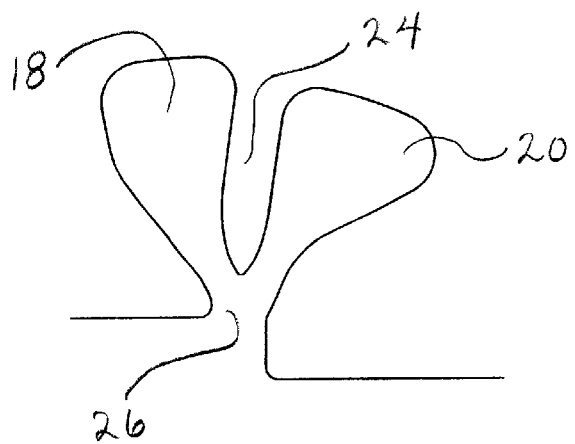
Figure 5K:
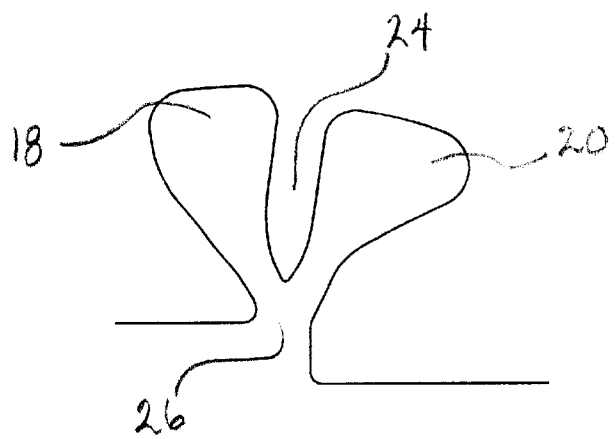
Figure 5L:
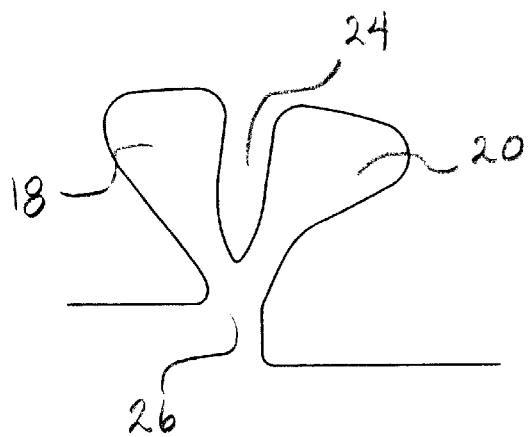
Figure 5M:
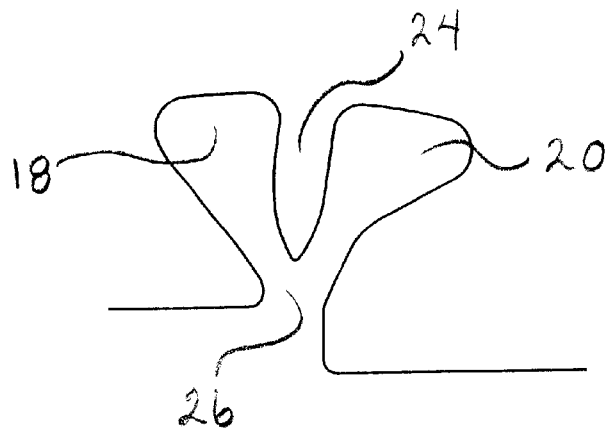
Figure 5N:
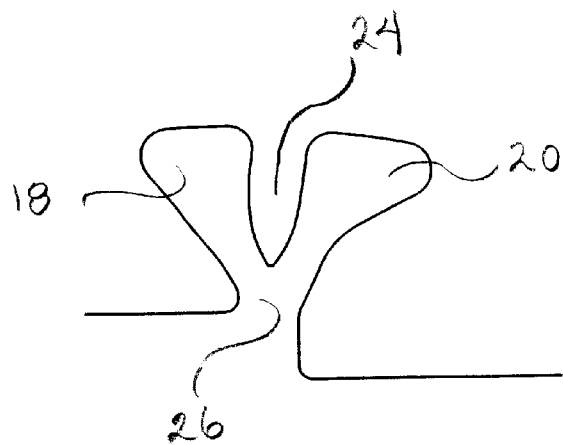
Figure 5O:
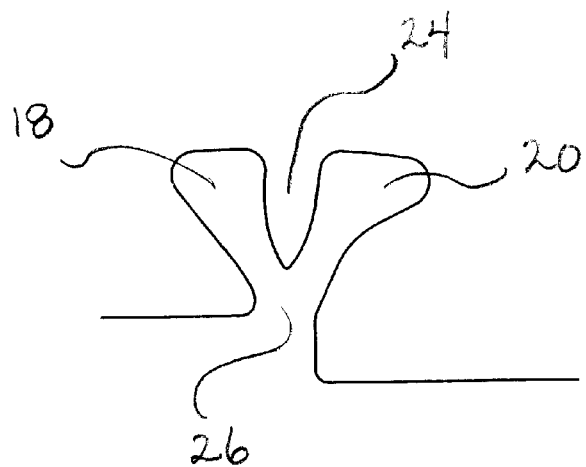
Figure 5P:
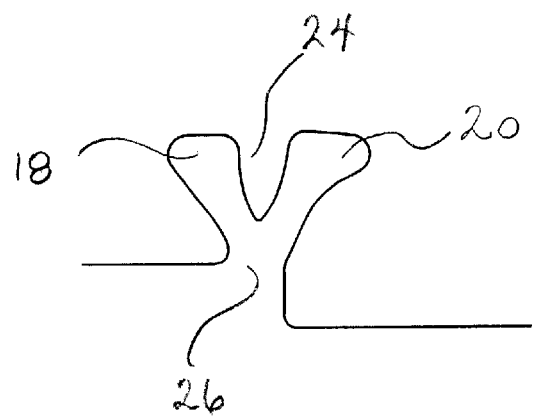
Figure 5Q:
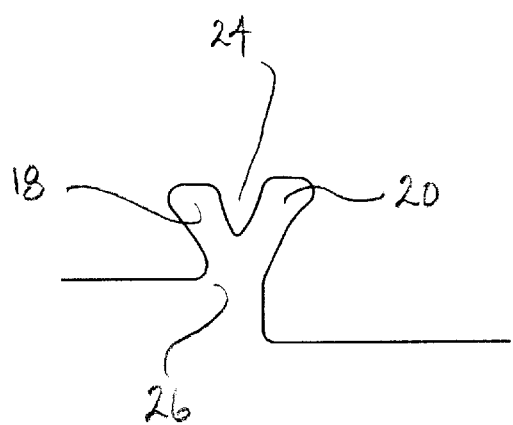
Figure 5R:
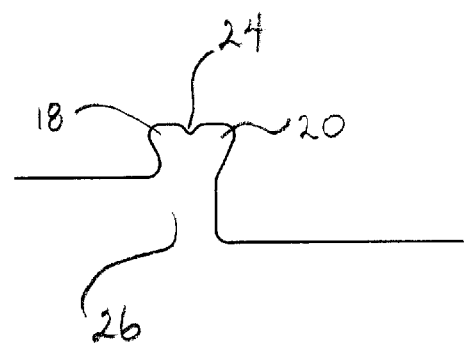

FIGS. 5a to 5r illustrate volute and wall divider cross-sectional profiles taken at different locations in the turbine housing where the volutes have become a single bifurcated volute that opens radially inwardly to direct exhaust gas to the turbine (i.e., where the dual volutes undergo a transition and merge along via a common channel). FIG. 5a illustrates the volutes at a point in the turbine housing generally depicted at the top of FIG. 2, where the volutes 18 and 20 are no longer completely separated by the wall divider 24, and where the volutes both joined together along a radially inwardly positioned portion to form the inlet nozzle 26 of the housing. Generally speaking, at this point and the remaining locations in the housing moving away from this point, the volutes and the wall divider each diminish in size. While the need to reduce the volute size is known in the art, and is necessary for purposes of directing the flow of exhaust gas radially inwardly within the turbine housing to drive the centrally mounted turbine, the specific manner in which it is done according to this invention helps to reduce unwanted thermal stress effects.

FIGS. 5b to 5k illustrate how the volutes and wall divider each undergo a reduction in size, moving further through the housing from FIG. 5a. Additionally, moving away from FIG. 5a, the volutes undergo a shape change, whereby the shape differences between the two volutes begin to lessen. For example, looking at FIG. 5h, the two volutes appear to almost be identical in size and shape. Finally, FIGS. 5o to 5r illustrate the final reduction in volute size and wall divider moving within the turbine housing away from the point at FIG. 5h, until the wall divider substantially vanishes and the two volutes substantially merge as one.

With respect to the general construction of the turbine housing and volutes, according to principles of this invention, the volutes are designed having an articulated construction to mostly grow radially under transient thermal expansion, thereby reducing bending around the V-band area. As best seen in FIG. 2, the portions 26 of the walls of the volutes at the V-band area are constructed having an elongated almost vertically-aligned wall, substantially parallel to the flange 28 for the V-band clamp 30, rather than traditional symmetric short bulging walls. This configuration eliminates the typical geometry wherein the casting of the volute adjacent the V-band flange is notched to accommodate the flange and clamp. Avoiding this notched geometry precludes the thermal stress risers and likelihood for cracking created by such a geometry. The volutes are also configured having the transition between cast and machined regions removed from areas on the volute walls, with a higher stress to flange connection at the center housing with lower stress levels.

Turbocharger turbine housings constructed according to this invention, comprising the above-described design and construction features, provide improved control over thermal loading during turbocharger operation, thereby functioning to reduce and/or eliminate thermal stress related damage to the turbine housing, e.g., stress cracking, to extend effective turbocharger service life.

Having now described the invention in detail as required by the patent statutes, those skilled in the art will recognize modifications and substitutions to the specific embodiments disclosed herein. Such modifications are within the scope and intent of the present invention.

What is claimed is:

1. A turbine housing used for containing a turbocharger turbine, the turbine housing comprising:
    an exhaust inlet at one radial housing end, an exhaust outlet at one axial housing end, a V-band flange at an axial housing end opposite the exhaust outlet for attachment to a center housing, wherein the housing has a generally circular shape;
    a pair of volutes disposed within the housing and in gas flow communication with the exhaust inlet and outlet, the volutes being separated from one another by a wall divider, wherein the size and shape of the volutes change with respect to one another moving through the turbine housing away from the exhaust inlet and wherein a first volute increases in a radial dimension relative to a second volute, and the second volute increases in an axial dimension relative to the first volute; and
    a flange disposed at the exhaust inlet, wherein at the exhaust inlet the pair of volutes are symmetric with one another about the wall divider forming an X-shaped pattern.

2. The turbine housing as recited in claim 1 wherein a casting wall of the volute adjacent the V-band flange is substantially parallel to the V-band flange.

3. The turbine housing as recited in claim 2 wherein the wall divider between the volutes decreases in area moving through the turbine housing away from the exhaust inlet.

4. The turbine housing as recited in claim 2 wherein, at a point in the housing, the pair of volutes merge with one another through a common channel.

5. A turbine housing used for containing a turbocharger turbine, the turbine housing comprising:
    an exhaust inlet at a radial housing end and an exhaust outlet at an axial housing end, wherein the housing has a generally circular shape; and
    a pair of volutes disposed within the housing and in gas flow communication with the exhaust inlet and the exhaust outlet, the volutes being separated at the exhaust inlet by a volute wall divider having two opposing concave wall surfaces.

6. The turbine housing as recited in claim 5 wherein the two opposing concave wall surfaces are curved.

7. The turbine housing as recited in claim 5 further comprising a V-band flange at the axial housing end opposite the exhaust outlet for attachment to a center housing wherein a casting wall of the volute adjacent the V-band flange is substantially parallel to the V-band flange.

8. The turbine housing as recited in claim 5 wherein the size and shape of the volutes change with respect to one another moving through the turbine housing away from the exhaust inlet.

9. The turbine housing as recited in claim 5 wherein a first volute increases in a radial dimension relative to a second volute, and the second volute increases in an axial dimension relative to the first volute.

10. The turbine housing as recited in claim 5 wherein the wall divider between the volutes decreases in area moving through the turbine housing away from the exhaust inlet.

11. The turbine housing as recited in claim 5 wherein, at a point in the housing, the pair of volutes merge with one another through a common channel.

12. The turbine housing as recited in claim 5 wherein the volute wall divider comprises a minimum wall thickness defined by respective minima of the two opposing concave wall surfaces.

13. The turbine housing as recited in claim 12 wherein each volute has a substantially uniform volute wall thickness that is approximately equal to the minimum wall thickness of the volute wall divider.

14. The turbine housing as recited in claim 5 wherein each volute has a substantially uniform volute wall thickness.

* * * * *